Jan. 12, 1960 P. SCHAURTE 2,920,815
APPARATUS FOR CONVEYING GASES OR LIQUIDS
Filed Aug. 3, 1955 5 Sheets-Sheet 4
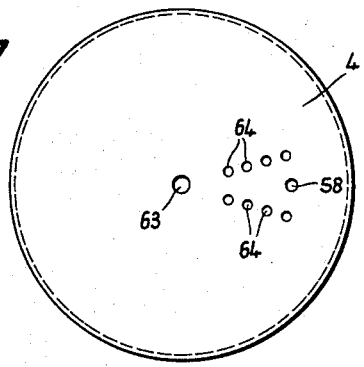
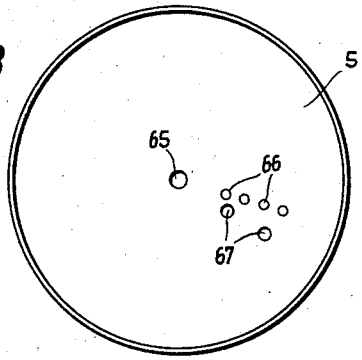
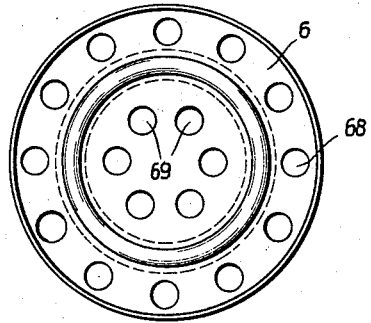

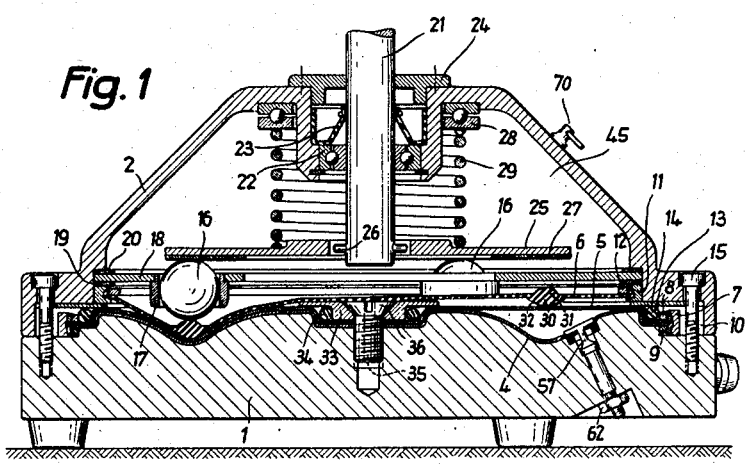
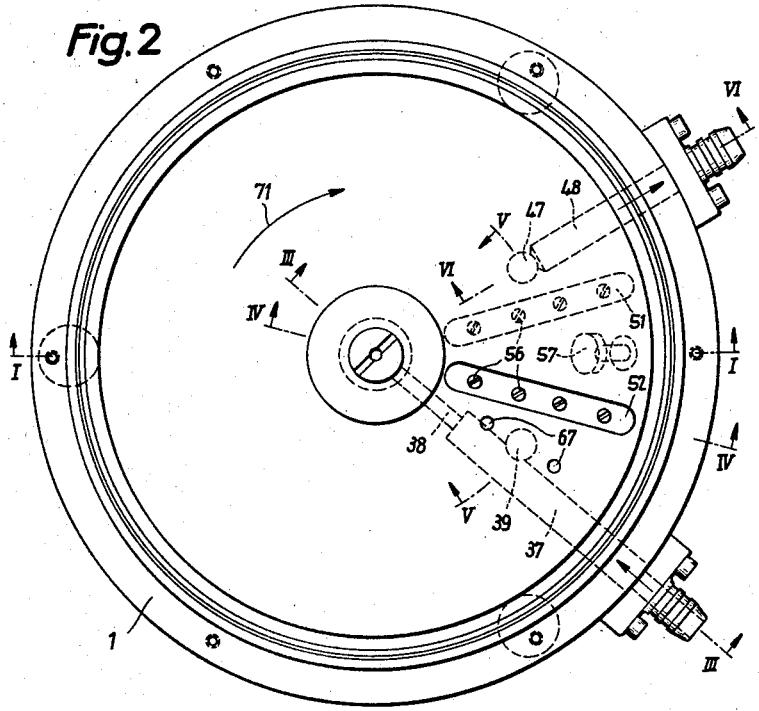

Jan. 12, 1960 P. SCHAURTE 2,920,815
APPARATUS FOR CONVEYING GASES OR LIQUIDS
Filed Aug. 3, 1955 5 Sheets-Sheet 5

United States Patent Office
2,920,815
Patented Jan. 12, 1960

2,920,815
APPARATUS FOR CONVEYING GASES OR LIQUIDS

Paul Schaurte, Schaan-Sax, Liechtenstein

Application August 3, 1955, Serial No. 526,154

Claims priority, application Germany, August 4, 1954

13 Claims. (Cl. 230—168)

The present invention relates to improvements in apparatus for conveying gases or liquids, and more particularly in apparatus of the type disclosed in my copending application, Serial No. 468,946, now Patent No. 2,841,091.

The apparatus of this type known prior to this invention, generally called rotary or positive-displacement pumps, usually comprise some resilient, deformable diaphragm member which is closing an operating chamber, and rolling bodies which are revolving about a central axis extending vertically to the resilient diaphragm member and which are adapted to act upon such member so as to deform the same and partition the operating chamber progressively at the respective point of compression. Thus, the cross-sectional area of the operating chamber varies continuously during the operation, and the chamber space behind the rolling body or bodies, that is, on the suction side of the pump, will be continuously enlarged when the resilient member is released by the rolling body or bodies and springs back to its original position, while ahead of the latter, that is, on the compression side of the pump, the chamber space will be continuously reduced.

In my copending application, Serial No. 468,946, it has been proposed similarly as in other pumps of this general type that the rolling bodies be placed in direct contact with a resilient diaphragm which covers an annular troughlike groove in the pump housing which forms the operating chamber of the pump. The generatrix of this groove substantially consists of a central arc which is connected with two adjacent curved portions in such a manner that the common tangent which is determined by the connecting points forms a tangent through the point of inflection. The rolling bodies are then forced resiliently against the diaphragm by means of a disklike member which is rotated by the driving shaft of the pump.

The diaphragm covering the operating chamber was fixed relative to the pump housing at least at one point so as to interrupt or partition such chamber at such point. As long as no rolling bodies were acting upon the diaphragm, the uniformly thick diaphragm extended within a plane vertical to the rotating pump shaft, except for the point where it was deformed by being secured relative to the housing. An operating chamber according to such a design had the advantage that the diaphragm was equally extended at any point of its cross section.

It is now an object of the present invention to improve a pump of this type by reducing the internal working within the diaphragm which is caused by the direct action of the rolling bodies thereon.

A feature of the invention for attaining this object consists in the provision of at least two superimposed diaphragms for closing off the operating chamber, while another feature of the invention consists in providing the second diaphragm so as to be of a special design and shape in order to obtain the advantage that, when the apparatus is used as a suction pump, the space within which the rolling bodies revolve will also be automatically evacuated.

A further advantage of a pump designed according to the present invention is that it may be used for conveying two or more different media simultaneously. Thus, while the main operating chamber either pumps or evacuates one medium, for example, a gas or air, the auxiliary chamber formed by the space between two adjacent diaphragms may simultaneously either pump or evacuate another medium, for example, a liquid.

Further objects, features, and advantages of the present invention will be apparent from the following detailed description thereof, as well as from the accompanying drawings which show one embodiment of the invention in the form of a vacuum pump, and in which—

Fig. 1 shows a cross section through a vacuum pump according to the present invention.

Fig. 2 shows a plan view of the base member of the pump after the cover has been removed therefrom;

Fig. 7 shows a plan view of the diaphragm covering the operating chamber;

Fig. 8 shows a plan view of the second diaphragm which is superimposed upon the diaphragm shown in Fig. 7;

Fig. 9 shows a plan view of the third diaphragm which is in engagement with the rolling bodies;

Fig. 11 shows a plan view of the diaphragms secured between rings as shown in Fig. 10; while

Figure 3:
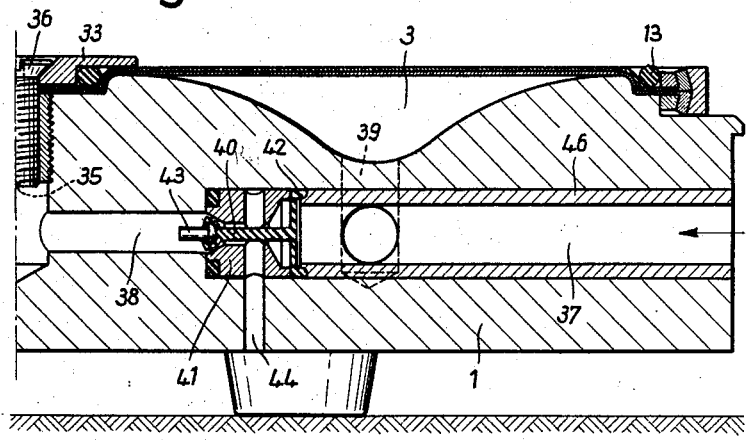
Fig. 3 shows a cross section taken along line III—III of Fig. 2.

Referring to the drawings, the vacuum pump according to the invention essentially consists of a base member 1 and a cover 2. The base member 1 contains an annular troughlike groove 3 which forms the operating chamber of the pump. The generatrix of groove 3 substantially consists of a central arc which merges into two portions which are curved in the opposite direction in such a manner that the common tangent which is determined by the points of merger forms a tangent through the point of inflection.

In the preferred embodiment of the invention as illustrated in the drawings, three diaphragms 4, 5, and 6 are provided, all of which are substantially cup-shaped so that the generatrix of diaphragms 4 and 5 may be secured between an outer double-cone ring 7 and two inner conical rings 8 and 9 which are designed similar to snap rings and are placed within an annular recess 10 near the periphery of the base member 1. Diaphragm 6 is secured between rings 11 and 12 which are likewise of conical shape and are preferably mounted within cover 2 so as to permit diaphragm 6 and rings 11 and 12 to be rotatable within the plane of the diaphragm. A rubber ring 13 is privided for tensioning diaphragms 4 and 5 in a radial direction and for sealing the cover 2 relative to base member 1. Thus, the diaphragms 4 and 5 are placed under a tension which is directed perpendicularly to the pressure of the rolling bodies.

Base member 1 and cover 2 are secured to each other by bolts 15 with an annular gasket 14 being interposed between them which rests upon rubber ring 13 and engages ring 11. Above rings 11 and 12, sleeve members 17 and annular plate 18 carrying the same are rotatably mounted in cover 2 between annular gaskets 19 and 20 and designed so as to form a cage for rotatably mounting the revolving bodies, i.e. balls 16, therein. The cage may either be designed so as to be driven directly or by a frictional drive as shown in the drawings.

The drive shaft 21 of the pump is mounted in the radial bearing 22 in cover 2 and sealed toward the outside by a sealing ring 23. The cover ring 24 is adapted to secure sealing ring 23, as well as ball bearing 22 within cover 2. Shaft 21 carries a disk 25 which is mounted thereon so as to be slidable in axial direction while rotating with shaft 21. Various means may be provided for taking along disk 25, such as, for example, a pin-and-slot connection 26. Disk 25 is preferably provided with a suitable coating 27 on the side facing the balls 16 so as to improve the frictional engagement between disk 25 and balls 16. A coil spring 29 mounted between disk 25 and a thrust bearing 28 constantly forces disk 25 against balls 16 so that the latter will press diaphragms 4, 5, and 6 into the operating chamber 3.

Within the area of contact with balls 16 diaphragm 6 is provided with an annular reinforcing bulge 30 projecting toward both sides of diaphragm 6. The outer contours of this bulge 30 which forms an integral part of diaphragms 6 are such that the radius of curvature of the upper bulge 31 facing balls 16 is smaller than that of the lower bulge 32 facing diaphragm 5.

Whereas diaphragm 6 is only secured along its periphery by being clamped between rings 11 and 12, diaphragms 4 and 5 are secured in a fixed position relative to base member 1, along their periphery by rings 7, 8, 9, as well as centrally by a disk 33. A further rubber sealing ring 34 is provided between disk 33 and diaphragms 4 and 5. Disk 33 is secured to base member 1 by a screw 36 which has a bore 35 therein which communicates with the horizontal inlet bore 37 through a bore 38. As shown particularly in Figs. 2 and 3, bore 37 communicates with a vertical bore 39 which connects the inlet, shown at the lower right of Fig. 2, with the operating chamber 3. A check valve 40 (Fig. 3) which is slidable with a certain play in axial direction in a housing 41 is provided between bores 37 and 38 and carries integrally thereon a diaphragm 42 which is subjected to the negative pressure in inlet 37. Valve 40 preferably consists of resilient synthetic rubber or similar material. The cylindrical part of valve 40 facing in the opposite direction of diaphragm 42 has an axial bore in which a rivet-like member 43 is fitted, for which purpose this end of valve 40 is widened. Valve housing 41 communicates with the outer atmosphere through a bore 44 which extends perpendicularly to bores 37 and 38 so that bore 38 and thus the chamber 45 within cover 2 will be under atmospheric pressure if inlet 37 will also be under atmospheric pressure. As is pointed out below, the diaphragm 6 is formed with openings passing therethrough (Fig. 9) so that in this way the interior 45 of the housing part 2 communicates through the opening of the diaphragm 6 with the space between the diaphragms 5 and 6, this space communicating with the bore 35. If inlet 37 will be under a partial vacuum, valve 40 closes off chamber 45 toward the outside. Valve housing 41 and valve 40 are fixed in place within base member 1 by a cylindrical tube 46 which may form an integral part of the inlet nipple which is mounted on the outer peripheral surface of base member 1.

Figure 5:
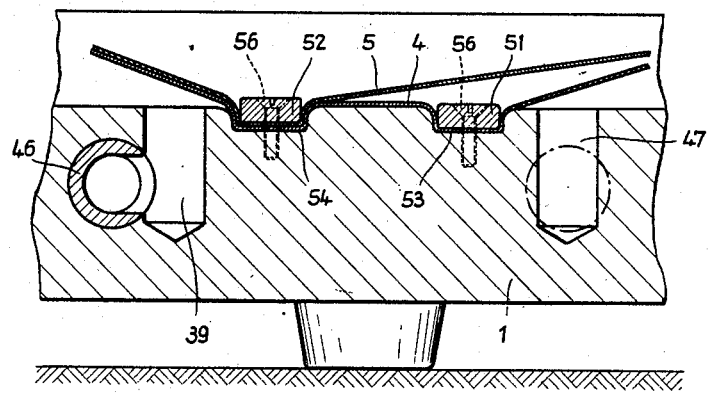
Fig. 5 shows a development taken along line V—V of Fig. 2.
Figure 6:
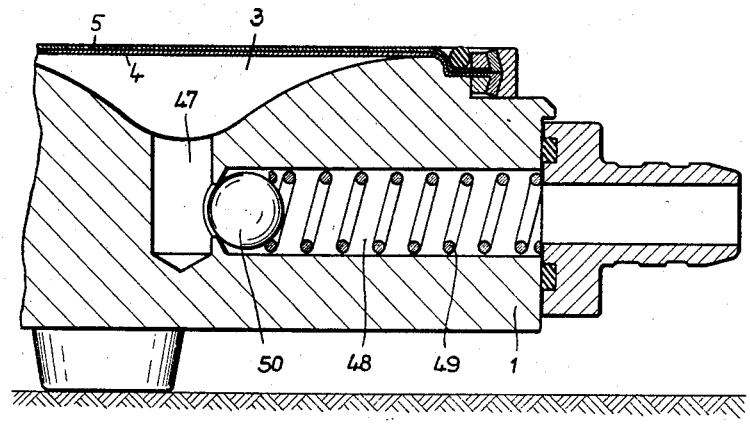
Fig. 6 shows a cross section taken along line VI—VI of Fig. 2.
Figure 10:
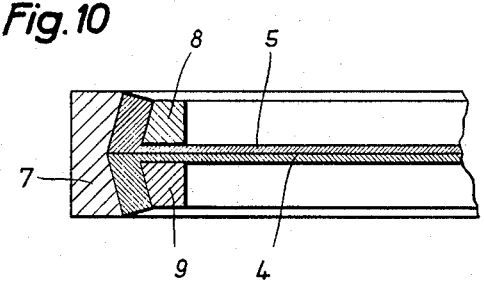
Fig. 10 shows an enlarged cross section taken through two diaphragms and the rings for securing the same.
Figure 11:
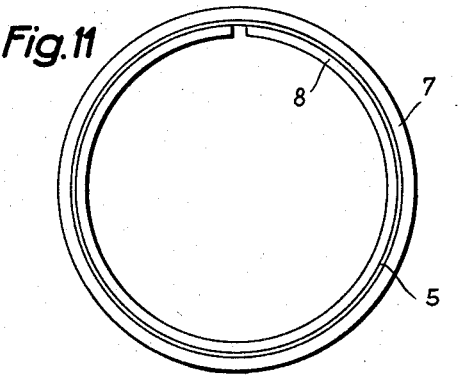

Operating chamber 3 communicates with an outlet 48 through a vertical bore 47, as shown particularly in Figs. 5 and 6. Between bore 47 and outlet 48 a check valve should be provided, for example, a ball 50 which is forced by a spring 49 against a seat which forms the bottom of bore 48 connecting the same with the vertical bore 47.

Figure 4:
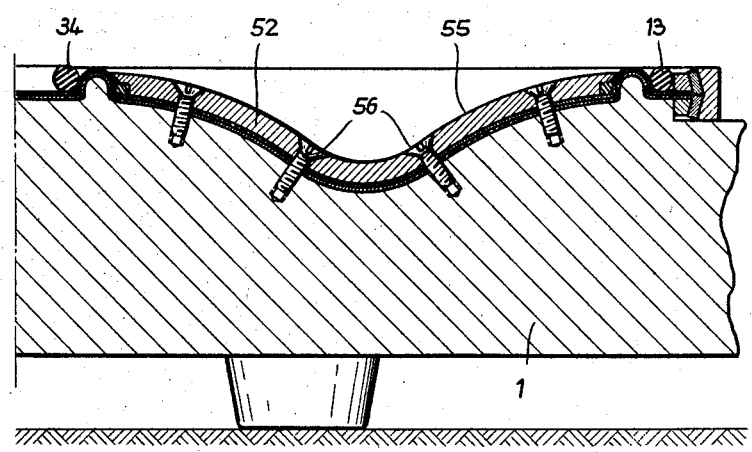
Fig. 4 shows a cross section taken along line IV—IV of Fig. 2.

Diaphragms 4 and 5 are secured in place within base member 1 intermediate bores 39 and 47 by suitable mounting means so that the troughlike groove forming the operating chamber 3 will thus be partitioned. Diaphragm 4 is secured in position by an arched strap 51 adjacent the bore 47, and both diaphragms 4 and 5 are similarly secured by an arched strap 52 adjacent bore 39. For this purpose, base member 1 is provided at those points where straps 51 and 52 are to be mounted with recesses 53 and 54, respectively, which are made of a depth so that, as shown in Fig. 4, the surfaces 55 of the straps will extend along the same curvature as the surfaces of the operating chamber 3 in the base member 1. Straps 51 and 52 and diaphragms 4 and 5 are drawn into recesses 53 and 54, respectively, by screws 56.

A relief valve 57 is mounted between straps 51 and 52 so that if a space is formed intermediate diaphragms 4 and 5 as a result of a difference in pressure, such space will automatically communicate with the outer atmosphere if the pressure in this space should rise above the atmospheric pressure. Relief valve 57 may be designed and arranged as shown in the drawing, or it may be provided at the periphery of diaphragms 4 and 5, or so as to open or close an opening at the periphery of diaphragms 4 and 5 and between these diaphragms.

Figure 12:
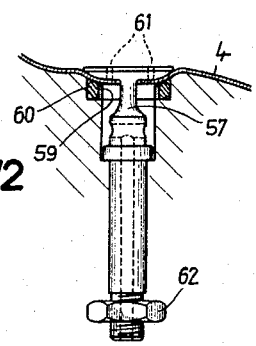
Fig. 12 shows an enlarged view of a check valve which leads into the operating chamber of the new pump.

In the embodiment of the invention as shown in Figs. 7 and 12, diaphragm 4 has an aperture 58 through which the stem of valve 57 is inserted. Aperture 58 is made of slightly larger diameter than the minimum diameter of the cylindrical part of valve 57. At this point, diaphragm 4 is supported by a rubber ring 60 placed around a thrust ring 59. The upper end of valve 57 is provided with one or more small bores 61 which are normally covered by the material of diaphragm 4 around aperture 58, and through which the excess pressure in the space between diaphragms 4 and 5 may escape to the outside through a central bore in the shaft of valve 57. Relief valve 57 is secured within base member 1 by means of a nut 62. Thus, if there is a pressure higher than atmospheric in the space between diaphragms 4 and 5 which is bordered by straps 51 and 52, it will force the unsupported material of diaphragm 4 adjacent aperture 58 downwardly and escape to the outside.

Aside from aperture 58, diaphragm 4 is also provided with a central aperture 63 and several apertures 64, the latter being used for passing screws 56 therethrough. As shown in Fig. 8, diaphragm 5 also has a central aperture 65 and several apertures 66 corresponding to apertures 64 in diaphragm 4, as well as one or more apertures 67 through which, if there is a difference in pressure, the space formed between diaphragms 4 and 5 communicates with the space between diaphragms 5 and 6, as well as with chamber 45 through apertures 68 and 69 in diaphragm 6, as shown in Fig. 9.

As shown in Fig. 1, cover 2 may also be provided with a valve 70 for admitting air into chamber 45 so that by suitable operation of valve 70 it will be possible to regulate the strength of the partial vacuum produced by the pump.

The pump as described above operates as follows:

It may first be assumed that all the chambers and spaces within the pump are under atmospheric pressure and that the inlet bore 37 is connected to a container which is to be evacuated. When rotating shaft 21 in the direction shown by arrow 71 in Fig. 2, disk 25 will also run in the same direction. Consequently, balls 16 will roll along diaphragm 6 and press diaphragms 4, 5, and 6 at successive points into the operating chamber 3.

If one of balls 16 rolls over and beyond bore 39, a reduced pressure will be formed in operating chamber 3 behind the respective ball 16 by the resilience of the three diaphragms 4, 5, and 6. As soon as the next ball 16 rolls beyond bore 39, operating chamber 3 which thus forms a low-pressure chamber will be closed and the quantity of air or gas contained therein will be conveyed along between the two balls 16 until the first of them rolls over bore 47 so that such low-pressure chamber will then be communicating with the outlet 48. The second ball 16 then comprises the medium contained in operating chamber 3 between the two balls and forces the same toward the outside through check valve 50 and outlet 48 since diaphragm 4 is pressed into operating chamber 3 by strap 51, thus closing the same. As long as the reduced pressure does not exceed a certain value, diaphragm 4 again disengages from the surface of operating chamber 3 adjacent to aperture 39 so that, if not affected by any balls 16, it still lies within a plane parallel to the planes of the other diaphragms 5 and 6. As the partial vacuum increases in operating chamber 3, a space forms between diaphragms 4 and 5 which is substantially limited, on the one hand, by strap 52 and, on the other hand, by one of the balls 16, and is the larger the larger the difference in pressure, i.e. the more diaphragm 4 adheres to the surface of operating chamber 3. Thus, as the space between diaphragms 4 and 5 increases, the output will decrease.

Since the balls 16 revolve continuously and diaphragm 5 is provided with one or two apertures 67 adjacent bore 39, a certain quantity of gas or air will be conveyed along between two successive balls and diaphragms 4 and 5, and such quantity cannot pass off through bores 47 and 48, but will be retained between diaphragms 4 and 5 until the space between diaphragms 4 and 5 containing the quantity of gas or air which is being conveyed arrives in front of the strap 52. Such compressed quantity of gas or air may then escape through the check valve 57.

After the balls 16 have rolled several times along the diaphragm surface, chamber 45 will also be evacuated. Since diaphragm 4 no longer engages with the surface of operating chamber 3 when the pressure in chamber 45 is substantially equal to that in the inlet 37, the quantity of air or gas conveyed will always be practically constant.

By mounting the diaphragm 6 independently of the other diaphragms 4 and 5, the advantage will be obtained that this diaphragm will not be excessively extended, and will thus not be overloaded, when the balls 16 are acting thereon.

By separating the resilient deformable means for closing off the operating chamber 3 into several diaphragms not only the advantage is obtained that the internal working will be considerably reduced, to which the material of such means is subjected during the operation of the pump, but also the further advantage which is of importance particularly in vacuum pumps that the diaphragms also evacuate the pump housing or, if the pump is to be used for conveying gases or liquids which are to be compressed that different gases or liquids may be conveyed simultaneously within the main operating chamber 3 and between two adjacent diaphragms. Obviously, the diaphragms may be modified to suit the particular purpose of the pump.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. In a vacuum pump, in combination, an elongated channel formed with an inlet communicating with the interior of said channel and an outlet spaced from said inlet and also communicating with the interior of said channel, said inlet being adapted to be placed in communication with an article to be evacuated; a resilient flexible diaphragm fluid-tightly engaging with said channel and defining an operating chamber of the pump therewith, said diaphragm having an equilibrium position where said chamber has a given volume; depressing means cooperating with said diaphragm for depressing a portion into said channel and for advancing said depressed portion of said diaphragm along said channel from said inlet to said outlet; means cooperating with said diaphragm and said depressing means for preventing the latter from advancing the depressed portion of said diaphragm from said outlet to said inlet, whereby during a first phase in the operation of said pump part of said diaphragm extending from its depressed portion will be spaced from said channel due to the resiliency of said diaphragm to progressively evacuate an article communicating with said inlet during repeated movement of said depressed portion of said diaphragm from said inlet to said outlet, said first phase continuing until the pressure in said operating chamber is so low that said diaphragm is permanently depressed from its equilibrium position; and means cooperating with said depressing means and diaphragm during a second phase of the operation of said pump for reducing the pressure at an exterior face of said diaphragm which is directed away from said operating chamber until said diaphragm again can move due to its own resiliency toward its equilibrium position, so that the first phase of the operation can then be repeated, said first and second phases of the operation alternating with each other until the article is evacuated to a desired extent.

2. In a vacuum pump, in combination, an annular channel formed with an inlet and an outlet communicating with the interior of said channel and spaced from each other, said inlet being adapted to be connected with an article to be evacuated; a resilient flexible diaphragm fluid-tightly connected with said annular channel and defining an operating chamber of the pump extending in a given direction around the axis of said annular channel from said inlet toward said outlet; partition means cooperating with said channel and diaphragm at that part of the latter which extends in said given direction from said outlet to said inlet to prevent communication between said outlet and inlet in said given direction, rotary depressing means cooperating with said diaphragm for depressing a portion thereof and for advancing said depressed portion of said diaphragm in said given direction from said inlet to said outlet to evacuate an article communicating with said inlet during successive revolutions of said rotary depressing means along said channel during a first phase in the operation of the pump which continues until the pressure in said operating chamber is so low that said diaphragm is incapable of returning to its equilibrium position due to its own resiliency and is permanently depressed substantially from its equilibrium position; and means cooperating with said rotary means and diaphragm during a second phase in the operation of the pump for reducing the pressure at a surface of said diaphragm which is directed away from said operating chamber until said diaphragm can again move due to its own resiliency toward its equilibrium position, so that the first phase can then be repeated, said first and second phases alternating with each other until the article is evacuated to a desired extent.

3. In a vacuum pump, in combination, wall means forming a housing having an interior fluid-tightly closed off from the exterior of said housing, said wall means being formed with an annular channel directly toward the interior of said housing, and said wall means also being formed with an inlet and outlet communicating with the interior of said channel, said inlet being adapted to communicate with an article to be evacuated; a resilient flexible diaphragm fluid-tightly carried by said wall means in the interior of said housing formed thereby and having an equilibrium position fluid-tightly cooperating with said channel to define an operating chamber of the pump therewith, said diaphragm fluid-tightly separating an interior portion of said housing from said channel; means located between said inlet and outlet in said channel and cooperating with said diaphragm for preventing said inlet and outlet from communicating with each other in a given direction around the axis of said channel from said outlet to said inlet; rotary means located in said interior portion of said housing and cooperating with a portion of said diaphragm for depressing said portion of said diaphragm into said channel and for angularly advancing said portion in said given direction along said channel to evacuate an article communicating with said inlet during repeated revolutions of said rotary means which continue through a first phase of the operation of the pump until the diaphragm is incapable of returning due to its own resiliency to its equilibrium position and is permanently depressed substantially from its equilibrium position as a result of the low pressure in said operating chamber; and means in said interior portion of said housing cooperating with said rotary means and said diaphragm for evacuating said interior portion of said housing during a second phase in the operation of the pump until the pressure in said interior portion of said housing diminishes to an extent where said diaphragm is free to return due to its own resiliency toward its equilibrium position so that the first phase can then be repeated, whereby during alternate repetitions of said first and second phases an article communicating with said inlet will be evacuated beyond the limits of one occurrence of said first phase of operation.

4. In a vacuum pump, in combination, a wall having a face formed with an annular channel extending around a given axis, said wall being formed with an inlet and an outlet communicating with the interior of said channel and angularly displaced with respect to each other around said axis, said inlet being adapted to communicate with an article to be evacuated; an inner flexible resilient diaphragm engaging said face of said wall fluid-tightly along an inner endless line surrounded by said channel and an outer endless line surrounding said channel, and said inner diaphragm having an equilibrium position extending across said channel and defining an operating chamber therewith; an outer flexible resilient diaphragm engaging a face of said inner diaphragm which is directed away from said channel fluid-tightly along said inner and outer endless lines; first fluid-tight connecting means located between said outlet and inlet in a given direction around said axis from said outlet to said inlet and fluid-tightly connecting only said inner diaphragm with said wall in said channel so that said outlet cannot communicate in said direction around said axis with said inlet; second fluid-tight connecting means located between said first connecting means and said inlet in said given direction around said axis and fluid-tightly connecting said inner and outer diaphragms to said wall in said channel, so that a space between said diaphragms and extending from said first to said second connecting means in said given direction around said axis terminates at said second connecting means; discharge valve means communicating with said space between said diaphragms for directing fluid out of said space; cover means fluid-tightly connected with said wall and defining with the latter a housing in which said diaphragms are located and having at the side of said outer diaphragm directed away from said channel a hollow interior portion fluid-tightly closed off from the outer atmosphere, said outer diaphragm being formed adacent to said second connecting means at a side thereof located after said first connecting means and discharge valve means when proceeding in said given direction around said axis with an opening passing through said outer diaphragm and providing communication between the interior portion of said housing and the surface of said inner diaphragm which is directed away from said channel; and rotary depressing means carried by said housing in the interior portion thereof for depressing into said channel a pair of portions of said diaphragms which are angularly spaced from each other in said given direction around said axis by a distance less than the angular distance in said given direction from said second connecting means to said outlet and for advancing said depressed portions of said diaphragms in said given direction repeatedly around said axis so that during a first phase in the operation of the pump said inner diaphragm and rotary depressing means cooperate to evacuate an article connected with said inlet until the pressure in said channel is so low that said inner diaphragm is permanently depressed from said outer diaphragm, said rotary means then cooperating with said outer and inner diaphragms during a second phase in the operation of the pump to evacuate the interior portion of said housing through said opening of said outer diaphragm, said space between said diaphragms and said discharge valve means, until the pressure at the side of said inner diaphragm directed away from said channel is low enough to enable said inner diaphragm to return by its own resiliency toward said outer diaphragm so that the first phase can then be repeated, said first and second phases alternately being repeated until an article connected with the inlet is evacuated to a desired extent.

5. In a vacuum pump as recited in claim 4, a reinforcing diaphragm located at the side of said outer diaphragm directed away from said inner diaphragm and having an annular bulge engaged by said rotary depressing means for transmitting the force thereof to said outer and inner diaphragms, said reinforcing diaphragm being formed with an opening passing therethrough to provide communication between the interior portion of said interior housing and said outer diaphragm.

6. In a vacuum pump as recited in claim 5, said annular bulge having a pair of transversely curved convex annular surface portions respectively engaging said rotary depressing means and said outer diaphragm, and the radius of the transverse curvature of the portion of said bulge engaging said outer diaphragm being greater than the radius of the transverse curvature of the portion of said bulge engaging said rotary depressing means.

7. In a vacuum pump as recited in claim 4, said rotary depressing means including an annular plate located at the side of said outer diaphragm directed away from said inner diaphragm and supported in said housing for rotation about said axis, said annular plate being formed with openings passing therethrough, a plurality of ball members respectively located in said openings of said plate for rotation therewith, a pressure plate engaging said ball members at the side of said annular plate opposite from said outer diaphragm, a spring urging said pressure plate toward said outer diaphragm for urging said ball members into said channel to depress said portions of said diaphragms, and a rotary drive shaft connected with one of said plates for rotating the latter.

8. In a vacuum pump as recited in claim 4, said wall being formed with a passage communicating with said inlet and with the interior portion of said housing so that when the pump is not operating and an article to be evacuated is not connected with said inlet the interior of said channel as well as the interior portion of said housing are at atmospheric pressure, and valve means located in said passage for automatically closing said passage when an article to be evacuated is connected with said inlet and the pump has started to operate.

9. In a vacuum pump as recited in claim 4, valve means carried by said cover means for providing controlled communication between the interior portion of said housing and the outer atmosphere.

10. In a vacuum pump, in combination, a pumping chamber formed with an inlet and an outlet, both communicating with the interior of said pumping chamber, and said inlet being adapted to be placed in communication with an article to be evacuated; a resilient flexible diaphragm fluid-tightly engaging with said pumping chamber and having an equilibrium position in which said chamber has a given volume; depressing means co-operating with the diaphragm for depressing a portion thereof into said pumping chamber, said diaphragm having the tendency to return into said equilibrium position when not depressed by said depressing means, whereby during a first phase of the operation of said pump an article communicating with said inlet will be progressively evacuated by repeated depression of said diaphragm into said pumping chamber, said first phase continuing until the pressure in said pumping chamber is so low that the diaphragm is permanently depressed from its equilibrium position into said pumping chamber; control pump means located at the exterior face of said diaphragm and adapted to create only during a second phase of operation of said pump at said exterior face of said diaphragm a vacuum sufficient to return said diaphragm from depressed position into its equilibrium position; and means for actuating said control pump means only during said second phase of operation of said pump, so that the first phase of operation can then be repeated, said first and second phases of operation alternating with each other until the article is evacuated to a desired extent.

11. In a vacuum pump, in combination, a pumping chamber formed with an inlet and an outlet, both communicating with the interior of said chamber, and a pumping wall portion depressable from an inoperative position into said pumping chamber and having the tendency to return to said inoperative position; depressing means co-operating with said pumping wall portion of said pumping chamber for repeatedly depressing the same into said pumping chamber, whereby during a first phase of the operation of said pump an article communicating with said inlet of said pumping chamber will be progressively evacuated during repeated depression of said movable wall portion into said pumping chamber, said first phase continuing until the pressure in said pumping chamber is so low that said pumping wall portion is permanently depressed from its inoperative position into said pumping chamber; control pump means located at the exterior face of said pumping wall portion and adapted to create at said exterior face of said pumping wall portion only during a second phase of operation of said pump a vacuum sufficient to return said pumping wall portion from depressed position into its inoperative position; and means for actuating said control pump means only during said second phase of operation of said pump, so that the first phase of operation can then be repeated, said first and second phases of operation alternating with each other until the article is evacuated to the desired extent.

12. In a vacuum pump, in combination, a pumping chamber formed with an inlet and an outlet, both communicating with the interior of said pumping chamber and said inlet being adapted to be placed in communication with an article to be evacuated; a resilient flexible diaphragm fluid-tightly engaging with said pumping chamber and having an equilibrium position in which said chamber has a given volume; depressing means co-operating with the diaphragm for depressing a portion thereof into said pumping chamber, said diaphragm having the tendency to return into said equilibrium position when not depressed by said depressing means, whereby during a first phase of the operation of said pump an article communicating with said inlet will be progressively evacuated by repeated depression of said diaphragm into said pumping chamber, said first phase continuing until the pressure in said pumping chamber is so low that the diaphragm is permanently depressed from its equilibrium position into said pumping chamber; and means co-operating with said depressing means and diaphragm during a second phase of the operation of said pump for reducing the pressure at the exterior face of said diaphragm which is directed away from said pumping chamber until said diaphragm again moves due to its own resiliency toward its equilibrium position, so that the first phase of the operation can then be repeated, said first and second phases of the operation alternating with each other until the article is evacuated to a desired extent.

13. In a vacuum pump, in combination, a pumping chamber formed with an inlet and an outlet, both communicating with the interior of said chamber, and a pumping wall portion depressable from an inoperative position into said pumping chamber and having the tendency to return to said inoperative position; depressing means co-operating with said pumping wall portion of said pumping chamber for repeatedly depressing the same into said pumping chamber, whereby during a first phase of the operation of said pump an article communicating with said inlet of said pumping chmaber will be progressively evacuated during repeated depression of said movable wall portion into said pumping chamber, said first phase continuing until the pressure in said pumping chamber is so low that said pumping wall portion is permanently depressed from its inoperative position into said pumping chamber; and means co-operating with said depressing means and said pumping wall portion only during a second phase of operation of said pump for reducing the pressure at an exterior face portion of said pumping wall portion which is directed away from said pumping chamber until said pumping wall portion moves toward its inoperative position, so that the first phase of the operation can then be repeated, said first and second phases of the operation alternating with each other until the article is evacuated to a desired extent.

References Cited in the file of this patent

UNITED STATES PATENTS

| | | |
|---|---|---|
| 664,507 | Singer | Dec. 25, 1900 |
| 922,205 | Still | May 18, 1909 |
| 2,483,924 | Moulinier | Oct. 4, 1949 |
| 2,671,412 | Rand | Mar. 9, 1954 |

FOREIGN PATENTS

| | | |
|---|---|---|
| 669,809 | Great Britain | Apr. 9, 1952 |